US009598976B2

(12) United States Patent
Siorek et al.

(10) Patent No.: US 9,598,976 B2
(45) Date of Patent: Mar. 21, 2017

(54) CERAMIC PEDESTAL AND SHIELD FOR GAS PATH TEMPERATURE MEASUREMENT

(71) Applicant: SOLAR TURBINES INCORPORATED, San Diego, CA (US)

(72) Inventors: Michal Peter Siorek, Carlsbad, CA (US); Kevin Liu, San Diego, CA (US); Hassan Nehari, Encinitas, CA (US)

(73) Assignee: Solar Turbines Incorporated, San Diego, CA (US)

( * ) Notice: Subject to any disclaimer, the term of this patent is extended or adjusted under 35 U.S.C. 154(b) by 512 days.

(21) Appl. No.: 14/155,011

(22) Filed: Jan. 14, 2014

(65) Prior Publication Data

US 2015/0198094 A1 Jul. 16, 2015

(51) Int. Cl.

| | |
|---|---|
| ***F02C 7/20*** | (2006.01) |
| ***F01D 17/26*** | (2006.01) |
| ***F01D 9/06*** | (2006.01) |

(52) U.S. Cl.

CPC ............. *F01D 17/26* (2013.01); *F01D 9/065* (2013.01); *F05D 2270/80* (2013.01)

(58) Field of Classification Search

CPC . F02C 7/20; F01D 17/26; F01D 9/065; B64D 27/10

USPC ................... 60/796, 797; 73/204.23, 204.11; 374/179, 100, 163

See application file for complete search history.

(56) References Cited

U.S. PATENT DOCUMENTS

| | | | |
|---|---|---|---|
| 4,187,434 A | 2/1980 | Pater et al. | |
| 4,467,134 A | 8/1984 | Pustell et al. | |
| 4,770,544 A | 9/1988 | Mossey | |
| 4,948,264 A * | 8/1990 | Hook, Jr. ............... | G01K 13/02 374/138 |
| 5,348,395 A * | 9/1994 | Corr, II .................... | G01K 1/08 374/135 |
| 6,431,824 B2 * | 8/2002 | Schotsch ....................... | 374/145 |
| 7,036,983 B2 | 5/2006 | Green et al. | |
| 7,478,556 B2 * | 1/2009 | Ruffino .................... | G01K 7/42 374/E13.006 |
| 7,824,100 B2 | 11/2010 | Sakami et al. | |
| 2006/0263216 A1 * | 11/2006 | Brummel ................ | F01D 5/189 416/61 |
| 2012/0128468 A1 | 5/2012 | Schleif et al. | |

(Continued)

FOREIGN PATENT DOCUMENTS

| | | |
|---|---|---|
| EP | 546786 A1 | 6/1993 |
| JP | 11014466 A | 1/1999 |
| WO | 9310427 A1 | 5/1993 |

*Primary Examiner* — Steven A. Reynolds

(74) *Attorney, Agent, or Firm* — Procopio, Cory, Hargreaves & Savitch, LLP

(57) ABSTRACT

A mounting stand for a temperature sensor is disclosed. The mounting stand includes a base, a pedestal, and a shield. The pedestal extends from the base to a pedestal end distal to the base. The pedestal includes a first hollow cylinder shape forming a bore there through. The shield includes a second hollow cylinder shape extending from the base about the pedestal and extending beyond the pedestal to a shield end distal to the base forming a flow region between the pedestal and the shield. The shield also includes a first aspiration hole extending through the second hollow cylinder shape.

19 Claims, 4 Drawing Sheets

(56) References Cited

U.S. PATENT DOCUMENTS

| | | | | |
|---|---|---|---|---|
| 2012/0186261 | A1* | 7/2012 | Toprani | F01D 9/065 60/772 |
| 2012/0297792 | A1* | 11/2012 | Dillard | F01D 17/085 60/796 |
| 2013/0042668 | A1 | 2/2013 | Johns et al. | |
| 2014/0010632 | A1* | 1/2014 | Spangler | F01D 5/186 415/115 |
| 2015/0114006 | A1* | 4/2015 | Tan | F02C 7/20 60/797 |

* cited by examiner

CERAMIC PEDESTAL AND SHIELD FOR GAS PATH TEMPERATURE MEASUREMENT

TECHNICAL FIELD

The present disclosure generally pertains to gas turbine engines, and is more particularly directed toward a ceramic pedestal and shield for gas path temperature measurement in the gas turbine engine.

BACKGROUND

Gas turbine engines include compressor, combustor, and turbine sections. During operation, the turbine section is subjected to high temperatures. Temperature sensors are often used to measure the gas path temperature in the turbine, and in particular the first stage of the turbine.

A shield is often located around the temperature sensor used to measure the gas path temperature. U.S. Pat. No. 4,187,434 to F. Pater, Jr. discloses a suction pyrometer radiation shield comprising an elongated first alumina refractory tube, a series of smaller alumina refractory tubes arranged around and bonded to the inside surface of said first tube forming central passageway, an outer fracture resistant alumina refractory tube surrounding said first tube and an alumina refractory washer closely surrounding said first tube in abutting contact with said outer alumina refractory tube.

The present disclosure is directed toward overcoming one or more of the problems discovered by the inventors or that is known in the art.

SUMMARY OF THE DISCLOSURE

A mounting stand for a temperature sensor is disclosed. The mounting stand includes a base, a pedestal, and a shield. The pedestal extends from the base to a pedestal end distal to the base at a pedestal length. The pedestal includes a first hollow cylinder shape forming a bore there through. The bore is sized to hold the temperature sensor. The shield includes a second hollow cylinder shape extending from the base about the pedestal and extending beyond the pedestal to a shield end distal to the base forming a flow region with an annular shape between the pedestal and the shield. The shield also includes a first aspiration hole extending through the second hollow cylinder shape. The base, the pedestal, and the shield are formed of a ceramic material.

DETAILED DESCRIPTION

The systems and methods disclosed herein include a mounting stand for attaching a temperature sensor to a nozzle segment of a gas turbine engine. In embodiments, the mounting stand includes a base, a shield and a pedestal within the shield, each made of a ceramic material. The pedestal locates a temperature sensor within the shield. The overall design of the mounting stand including the length of the pedestal, the length of the shield beyond the pedestal, the size of the annular space between the pedestal and the shield, and the use of a ceramic material may reduce conduction between the nozzle segment and the mounting stand, may reduce radiation errors, may reduce convection errors, may promote a time accurate reading, and may reduce the manufacturing cost of the mounting stand.

Figure 1:
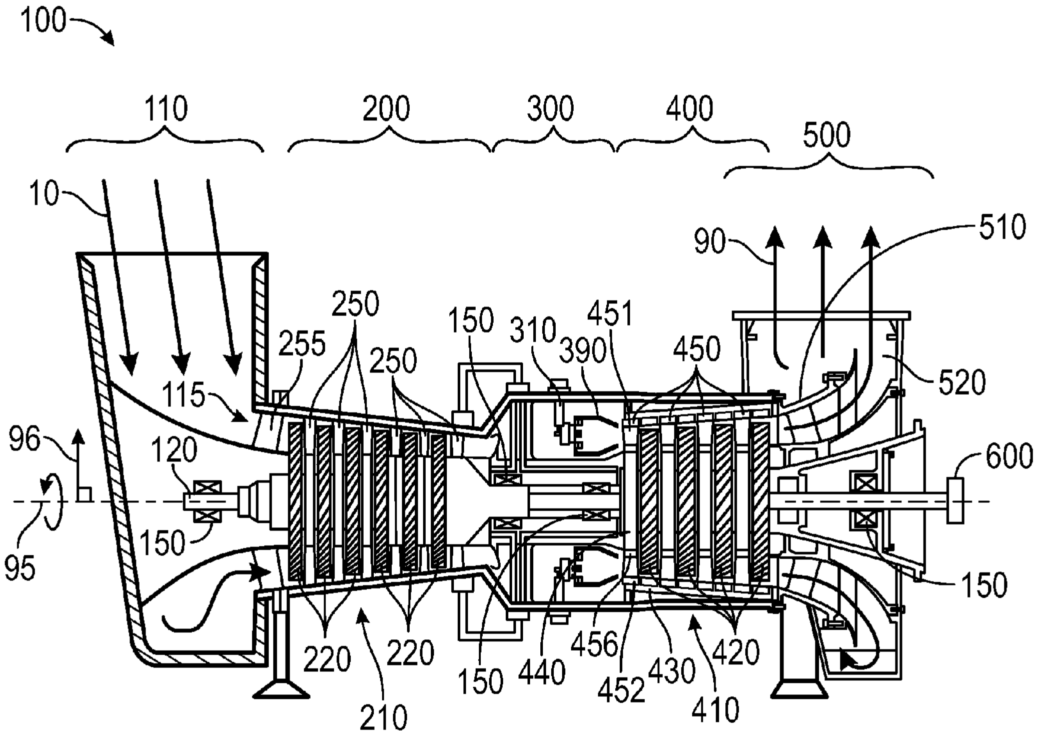
FIG. 1 is a schematic illustration of an exemplary gas turbine engine.

FIG. 1 is a schematic illustration of an exemplary gas turbine engine 100. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a shaft 120, a compressor 200, a combustor 300, a turbine 400, an exhaust 500, and a power output coupling 600. The gas turbine engine 100 may have a single shaft or a dual shaft configuration.

The compressor 200 includes a compressor rotor assembly 210, compressor stationary vanes (stators) 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the compressor stages.

The combustor 300 includes one or more fuel injectors 310 and includes one or more combustion chambers 390.

The turbine 400 includes a turbine rotor assembly 410 and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. A turbine nozzle 450, such as a nozzle ring, axially precedes each of the turbine disk assemblies 420. Each turbine nozzle 450 includes multiple nozzle segments 451 grouped together to form a ring. Each turbine disk assembly 420 paired with the adjacent turbine nozzle

450 that precede the turbine disk assembly 420 is considered a turbine stage. Turbine 400 includes multiple turbine stages.

The turbine 400 may also include a turbine housing 430 and turbine diaphragms 440. Turbine housing 430 may be located radially outward from turbine rotor assembly 410 and turbine nozzles 450. Turbine housing 430 may include one or more cylindrical shapes. Each nozzle segment 451 may be configured to attach, couple to, or hang from turbine housing 430. Each turbine diaphragm 440 may axially precede each turbine disk assembly 420 and may be adjacent a turbine disk. Each turbine diaphragm 440 may also be located radially inward from a turbine nozzle 450. Each nozzle segment 451 may also be configured to attach or couple to a turbine diaphragm 440.

The exhaust 500 includes an exhaust diffuser 510 and an exhaust collector 520. The power output coupling 600 may be located at an end of shaft 120.

Figure 2:
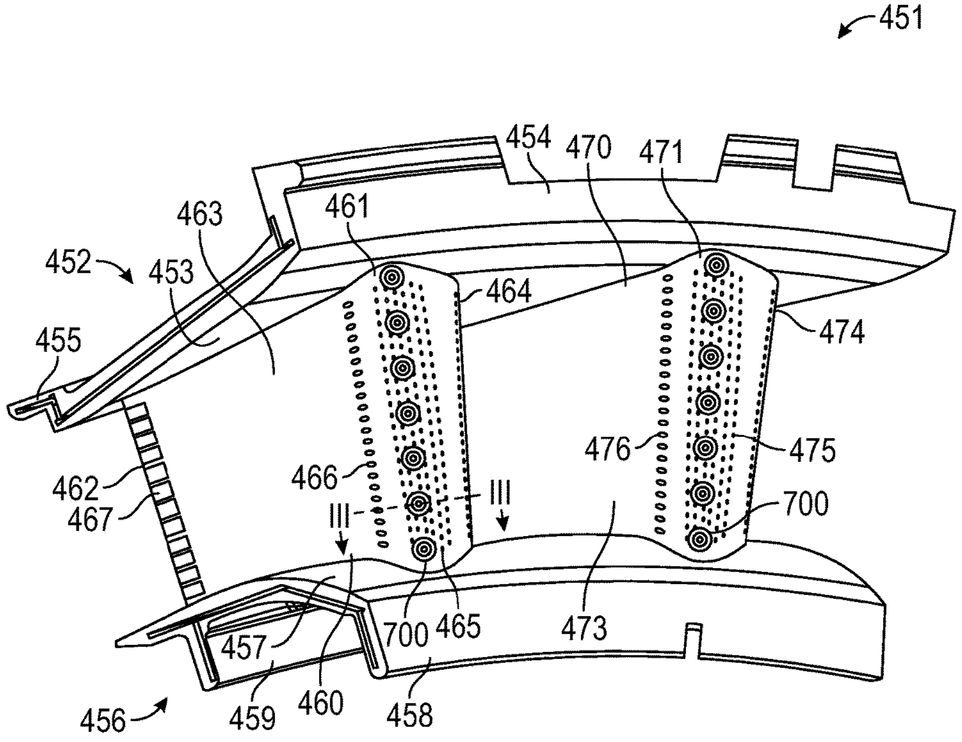
FIG. 2 is a perspective view of a nozzle segment for the gas turbine engine of FIG. 1 with multiple mounting stands attached to the nozzle segment.

FIG. 2 is a perspective view of a nozzle segment 451 for the gas turbine engine 100 of FIG. 1 with multiple mounting stands 700 attached to the nozzle segment 451. The mounting stands 700 are configured to hold temperature sensors 705 (shown in FIG. 3). Nozzle segment 451 includes upper shroud 452, lower shroud 456, airfoil 460, and second airfoil 470. In other embodiments, nozzle segment 451 can include more or fewer airfoils, such as one airfoil, three airfoils, or four airfoils. Upper shroud 452 may be located adjacent and radially inward from turbine housing 430 when nozzle segment 451 is installed in gas turbine engine 100. Upper shroud 452 includes upper endwall 453. Upper endwall 453 may be a portion of an annular shape, such as a sector. For example, the sector may be a sector of a toroid (toroidal sector) or a sector of a hollow cylinder. The toroidal shape may be defined by a cross-section with an inner edge including a convex shape. Multiple upper endwalls 453 are arranged to form the annular shape, such as a toroid, and to define the radially outer surface of the flow path through a turbine nozzle 450. Upper endwall 453 may be coaxial to center axis 95 when installed in the gas turbine engine 100.

Upper shroud 452 may also include upper forward rail 454 and upper aft rail 455. Upper forward rail 454 extends radially outward from upper endwall 453. In the embodiment illustrated in FIG. 2, upper forward rail 454 extends from upper endwall 453 at an axial end of upper endwall 453. In other embodiments, upper forward rail 454 extends from upper endwall 453 near an axial end of upper endwall 453 and may be adjacent to the axial end of upper endwall 453. Upper forward rail 454 may include a lip, protrusion or other features that may be used to secure nozzle segment 451 to turbine housing 430.

Upper aft rail 455 may also extend radially outward from upper endwall 453. In the embodiment illustrated in FIG. 2, upper aft rail 455 is 'L' shaped, with a first portion extending radially outward from the axial end of upper endwall 453 opposite the location of upper forward rail 454, and a second portion extending in the direction opposite the location of upper forward rail 454 extending axially beyond upper endwall 453. In other embodiments, upper aft rail 455 includes other shapes and may be located near the axial end of upper endwall 453 opposite the location of upper forward rail 454 and may be adjacent to the axial end of upper endwall 453 opposite the location of upper forward rail 454. Upper aft rail 455 may also include other features that may be used to secure nozzle segment 451 to turbine housing 430.

Lower shroud 456 is located radially inward from upper shroud 452. Lower shroud 456 may also be located adjacent and radially outward from turbine diaphragm 440 when nozzle segment 451 is installed in gas turbine engine 100. Lower shroud 456 includes lower endwall 457. Lower endwall 457 is located radially inward from upper endwall 453. Lower endwall 457 may be a portion of an annular shape, such as a sector. For example, the sector may be a portion of a nozzle ring. Multiple lower endwalls 457 are arranged to form the annular shape, such as a toroid, and to define the radially inner surface of the flow path through a turbine nozzle 450. Lower endwall 457 may be coaxial to upper endwall 453 and center axis 95 when installed in the gas turbine engine 100.

Lower shroud 456 may also include lower forward rail 458 and lower aft rail 459. Lower forward rail 458 extends radially inward from lower endwall 457. In the embodiment illustrated in FIG. 2, lower forward rail 458 extends from lower endwall 457 at an axial end of lower endwall 457. In other embodiments, lower forward rail 458 extends from lower endwall 457 near an axial end of lower endwall 457 and may be adjacent lower endwall 457 near the axial end of lower endwall 457. Lower forward rail 458 may include a lip, protrusion or other features that may be used to secure nozzle segment 451 to turbine diaphragm 440.

Lower aft rail 459 may also extend radially inward from lower endwall 457. In the embodiment illustrated in FIG. 2, lower aft rail 459 extends from lower endwall 457 near the axial end of lower endwall 457 opposite the location of lower forward rail 458 and may be adjacent the axial end of lower endwall 457 opposite the location of lower forward rail 458. In other embodiments, lower aft rail 459 extends from the axial end of lower endwall 457 opposite the location of lower forward rail 458. Lower aft rail 459 may also include a lip, protrusion or other features that may be used to secure nozzle segment 451 to turbine diaphragm 440.

Airfoil 460 extends between upper endwall 453 and lower endwall 457. Airfoil 460 includes leading edge 461, trailing edge 462, pressure side wall 463, and suction side wall 464. Leading edge 461 extends from upper endwall 453 to lower endwall 457 at the most upstream axial location where highest curvature is present. Leading edge 461 may be located near upper forward rail 454 and lower forward rail 458. Trailing edge 462 may extend from upper endwall 453 axially offset from and distal to leading edge 461, adjacent the axial end of upper endwall 453 opposite the location of leading edge 461 and from lower endwall 457 adjacent the axial end of upper endwall 453 opposite and axially distal to the location of leading edge 461. When nozzle segment 451 is installed in gas turbine engine 100, leading edge 461, upper forward rail 454, and lower forward rail 458 may be located axially forward and upstream of trailing edge 462, upper aft rail 455, and lower aft rail 459. Leading edge 461 may be the point at the upstream end of airfoil 460 with the maximum curvature and trailing edge 462 may be the point at the downstream end of airfoil 460 with maximum curvature. In the embodiment illustrated in FIG. 1, nozzle segment 451 is part of the first stage turbine nozzle 450 adjacent combustion chamber 390. In other embodiments, nozzle segment 451 is located within a turbine nozzle 450 of another stage.

Pressure side wall 463 may span or extend from leading edge 461 to trailing edge 462 and from upper endwall 453 to lower endwall 457. Pressure side wall 463 may include a concave shape. Suction side wall 464 may also span or extend from leading edge 461 to trailing edge 462 and from upper endwall 453 to lower endwall 457. Suction side wall 464 may include a convex shape. Leading edge 461, trailing edge 462, pressure side wall 463 and suction side wall 464 may contain a cooling cavity 469 (partially shown in FIG. 3) there between.

Airfoil 460 includes multiple cooling holes or apertures, such as pressure side cooling apertures 466, suction side cooling apertures 467, and showerhead cooling apertures 465. Each cooling hole or aperture may be a channel extending through a wall of the airfoil 460. Each set of cooling apertures may be grouped together in a pattern, such as in a row or in a column.

Airfoil 460 may further include slots 468. Slots 468 may be located on pressure side wall 463 and may be adjacent trailing edge 462. Slots 468 may be rectangular and may be aligned in the radial direction between upper endwall 453 and lower endwall 457. Slots 468 may extend from cooling cavity 469 to trailing edge 462.

In the embodiment illustrated in FIG. 2, nozzle segment 451 includes second airfoil 470. Second airfoil 470 may be circumferentially offset from airfoil 460. Second airfoil 470 may include the same or similar features as airfoil 460 including second leading edge 471, second trailing edge (not shown), second pressure side wall 473, and second suction side wall 474. Second airfoil 470 may further include second pressure side cooling apertures 476, second suction side cooling apertures 477, second showerhead cooling apertures 475, and second slots (not shown). The description of second leading edge 471, the second trailing edge, second pressure side wall 473, second suction side wall 474, second pressure side cooling apertures 476, second suction side cooling apertures 477, second showerhead cooling apertures 475, and second slots may be oriented in the same or a similar manner as leading edge 461, trailing edge 462, pressure side wall 463, suction side wall 464, pressure side cooling apertures 466, suction side cooling apertures 467, showerhead cooling apertures 465, and slots 468 respectively.

The various components of nozzle segment 451 including upper shroud 452, lower shroud 456, airfoil 460, and second airfoil 470 may be integrally cast or metalurgically bonded to form a unitary, one piece assembly thereof.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, alloy x, INCONEL, WASPALOY, RENE alloys, HAYNES alloys, alloy 188, alloy 230, INCOLOY, MP98T, TMS alloys, Mar, M247, and CMSX single crystal alloys.

Figure 3:
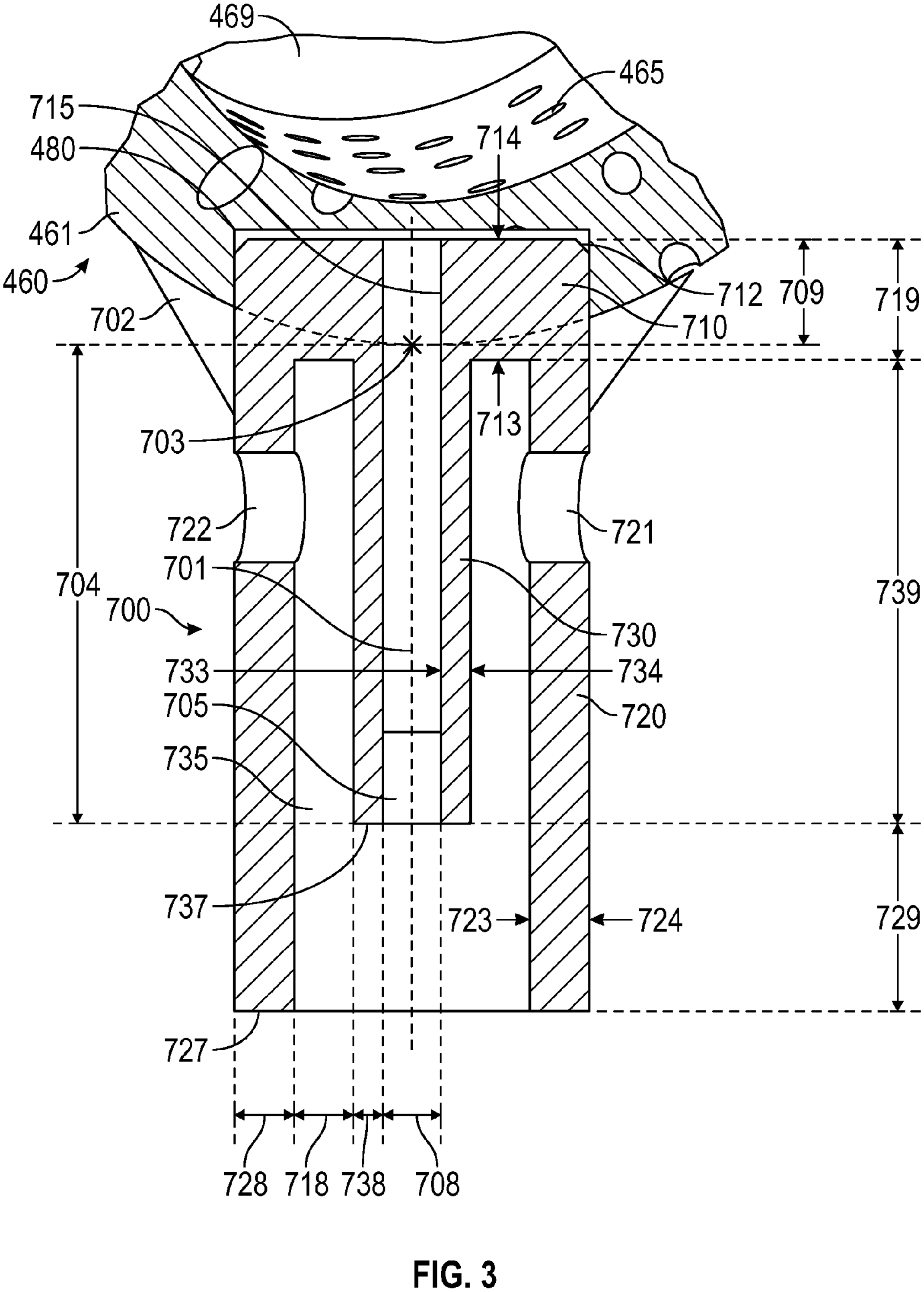
FIG. 3 is a cross-sectional view of the leading edge and the mounting stand of FIG. 2 taken along line III-III.

As illustrated in FIG. 2, multiple mounting stands 700 may be connected to the nozzle segment 451 along leading edge 461 and along second leading edge 471. FIG. 3 is a cross-sectional view of the leading edge 461 and the mounting stand 700 of FIG. 2 taken along line III-III. Mounting stand 700 includes a base 710, a pedestal 730, and a shield 720. Mounting stand 700 may also include a mounting stand axis 701. All references to radial, axial, and circumferential directions and measures related to the mounting stand 700 or a component of the mounting stand 700 refer to mounting stand axis 701 and terms such as "inner" and "outer" generally indicate a lesser or greater radial distance from mounting stand axis 701.

Base 710, pedestal 730, and shield 720 may be coaxial and may revolve about mounting stand axis 701. In the embodiment illustrated in FIG. 3, base 710 is a cylindrical disk. Base 710 includes a first base surface 713 and a second base surface 714 offset from the first base surface 713. The first base surface 713 and the second base surface 714 may each be a circular surface. Base 710 may include an outer edge chamfer 712 about the outer edge of second base surface 714. In one embodiment, base 710 extends at an axial length 719, the distance between first base surface 713 and second base surface 714, from 15.24 millimeters (0.60 inches) to 17.78 millimeters (0.70 inches). In another embodiment, base 710 extends at an axial length 719 of 16.51 millimeters (0.65 inches). The axial length 719 may be a function of the depth of embed hole 480.

In the embodiment illustrated in FIG. 3, pedestal 730 extends from base 710 and within shield 720. Pedestal 730 may extend from first base surface 713 in the direction opposite second base surface 714. Pedestal 730 may extend in the axial direction. Pedestal 730 includes a hollow cylinder shape forming a bore 715 therein. Pedestal 730 includes a pedestal inner surface 733 and a pedestal outer surface 734 located radially outward from pedestal inner surface 733. Pedestal inner surface 733 and pedestal outer surface 734 may be cylindrical surfaces and may form the hollow cylinder shape of pedestal 730. Pedestal inner surface 733 may form the cylindrical shape of bore 715.

In the embodiment illustrated, the bore 715 extends through pedestal 730 and through base 710. In other embodiments, bore 715 may not extend through base 710. Bore 715 may be sized to a bore diameter 708 to receive a temperature sensor 705 at the end distal to base 710. Bore diameter 708 may be sized and configured so that temperature sensor 705 is flush with the bore 715. Temperature sensor 705 may be within 1.27 millimeters (0.050 inches) from the end of pedestal 730 distal to base 710. Temperature sensor 705 may be secured to pedestal 730 with a bonding agent, such as a high temperature ceramic adhesive. The bonding agent may include an adhesive suitable for high temperature and high pressure applications and may have thermal expansion coefficients similar to the material of the nozzle segment 451.

Pedestal 730 includes a pedestal end 737 distal to base 710. In the embodiment illustrated in FIG. 3, pedestal 730 extends from base 710 to pedestal end 737 at a pedestal length 739. In one embodiment, pedestal length 739 is at least 4 millimeters (0.157 inches). In another embodiment, pedestal length 739 is at least 6.09 millimeters (0.24 inches). In yet another embodiment, pedestal length 739 is from 4 millimeters (0.157 inches) to 10 millimeters (0.394 inches). In still another embodiment, the pedestal length 739 is up to 10 millimeters (0.394 inches). In a further embodiment, the pedestal 730 extends beyond the leading edge 461 of airfoil 460 at an extruding length 704, the distance from the leading edge 461 to the pedestal end 737, at least 6.98 millimeters (0.275 inches). Reference point 703 illustrates the radial point of the leading edge 461 that aligns with mounting stand axis 701, where the extruding length 704 may be measured from. In another embodiment, the pedestal 730 extends beyond the leading edge 461 of airfoil 460 at least 7.36 millimeters (0.29 inches). In some embodiments, the pedestal 730 extends beyond the leading edge 461 of airfoil 460 up to 7.75 millimeters (0.305 inches).

Pedestal 730 may include a pedestal thickness 738, the radial thickness of pedestal 730 between pedestal inner surface 733 and pedestal outer surface 734. In one embodiment, pedestal thickness 738 is at least 0.381 millimeters (0.015 inches). In another embodiment, pedestal thickness 738 is from 0.381 millimeters (0.015 inches) to 1.02 millimeters (0.040 inches). In other embodiments, pedestal thickness 738 is up to 1.02 millimeters (0.040 inches).

In the embodiment illustrated in FIG. 3, shield 720 extends from base 710. Shield 720 may extend from first base surface 713 in the direction opposite second base surface 714. Shield 720 may extend in the axial direction and may extend from the radially outer edge of base 710. Shield 720 includes a hollow cylinder shape. Shield 720 includes a shield inner surface 723 and a shield outer surface 724. Shield inner surface 723 and shield outer surface 724 may be cylindrical surfaces and may form the hollow cylinder shape of shield 720.

Shield 720 includes a shield end 727 distal to base 710. In one embodiment, shield 720 extends axially beyond pedestal 730 at an entrance length 729, the axial distance between shield end 727 and pedestal end 737, at least 1.9 millimeters (0.075 inches). In another embodiment, shield 720 extends axially beyond pedestal 730 at an entrance length 729 from 1.9 millimeters (0.075 inches) to 5.08 millimeters (0.2 inches). In some embodiments, shield 720 extends axially beyond pedestal 730 at an entrance length 729 up to 2.80 millimeters (0.11 inches). In other embodiments, shield 720 extends axially beyond pedestal 730 at an entrance length 729 up to 5.08 millimeters (0.2 inches). In yet other embodiments, shield 720 extends axially beyond pedestal 730 at an entrance length 729 of 2.54 millimeters (0.10 inches).

Shield 720 may include a shield thickness 728, the radial thickness of shield 720 between shield inner surface 723 and shield outer surface 724. In one embodiment, shield thickness 728 is at least 0.635 millimeters (0.025 inches). In another embodiment, shield thickness 728 is from 0.635 millimeters (0.025 inches) to 1.905 millimeters (0.075 inches). In other embodiments, shield thickness 728 is up to 1.905 millimeters (0.075 inches).

Shield 720 may include multiple aspiration holes, such as a first aspiration hole 721 and a second aspiration hole 722. Each aspiration hole may extend through the hollow cylinder shape of shield 720 from shield inner surface 723 to shield outer surface 724 and may be proximal base 710. In some embodiments, such as the embodiment in FIG. 3, each aspiration hole extends radially through the hollow cylinder shape. In one embodiment, each aspiration hole includes a diameter of at least 0.762 millimeters (0.030 inches). In another embodiment, each aspiration hole includes a diameter from 0.762 millimeters (0.030 inches) to 2.032 millimeters (0.08 inches). In other embodiments, the diameter of each aspiration hole is up to 2.032 millimeters (0.08 inches).

Shield 720 is located radially outward from pedestal 730. Shield 720 and pedestal 730 may be spaced apart at an offset distance 718, the distance between shield inner surface 723 and pedestal outer surface 724, forming a flow region 735 there between. Flow region 735 is the annular space between shield 720 and pedestal 730 formed by shield inner surface 723 and pedestal outer surface 724. In one embodiment, the offset distance 718 is up to 1.27 millimeters (0.050 inches). In another embodiment, the offset distance 718 is from 0.635 millimeters (0.025 inches) to 1.27 millimeters (0.050 inches). In other embodiments, the offset distance 718 is at least 0.635 millimeters (0.025 inches).

Figure 4:
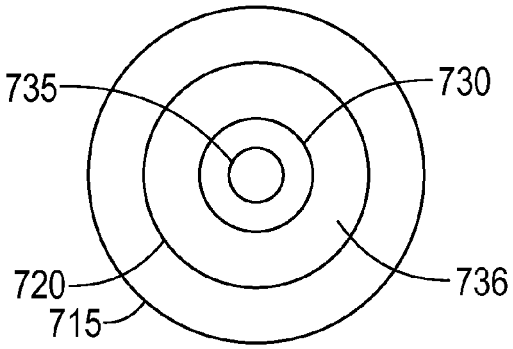
FIG. 4 is a top view of the mounting stand of FIG. 3.

FIG. 4 is a top view of the mounting stand 700 of FIG. 3. Referring to FIGS. 3 and 4, offset distance 718 may define a flow area 736. In one embodiment, the flow area 736 is up to 11.45 square millimeters (0.01775 square inches). In another embodiment, the flow area 736 is from 4.458 square millimeters (0.00691 square inches) to 11.45 square millimeters (0.01775 square inches). In a further embodiment, the flow area 736 is at least 4.458 square millimeters (0.00691 square inches).

Referring again to FIG. 3, the outer diameters of shield 720 and base 710 may be equal. In one embodiment, the outer diameters of both shield 720 and base 710 are from 4.69 millimeters (0.185 inches) to 4.83 millimeter (0.190 inches). In another embodiment, the outer diameters of both shield 720 and base 710 are from 4.31 millimeters (0.17 inches) to 7.62 millimeters (0.3 inches).

Referring to FIGS. 2 and 3, each mounting stand 700 may be inserted at an embed length 709 into an embed hole 480 bored into the leading edge 461. The embed length 709 may depend on the thickness of the airfoil 460 between the leading edge 461 and the cavity 469. In one embodiment, the embed length 709 is up to 1.651 millimeters (0.065 inches). In another embodiment, the embed length 709 is from 0.127 millimeters (0.005 inches) to 1.143 millimeters (0.045 inches). Each mounting stand 700 may be attached to airfoil 460 or second airfoil 470 with a bonding agent 702. The bonding agent 702 may be a high temperature ceramic adhesive, such as zirconia —.

Temperature sensor 705 may be made into various shapes, such as a cylinder, cube, sphere, etc., and have dimensions at the micrometer scale. Temperature sensor 705 may be suitable for measuring temperatures in a wide temperature range and in high temperature and high pressure environments, such as the conditions experienced within a gas turbine engine during operation. For example, temperature sensor 705 may be configured to measure temperatures between 150 degrees Celsius and 1450 degrees Celsius.

Temperature sensor 705 may be made of an irradiated crystal, such as silicon carbide or Izmeritel Maximalnoi Temperaturi Kristalincheskii (IMTK) crystal. Temperature sensor 705 may record and provide temperature information through microstructural changes without the need for wires. The microstructural changes may be deformations to crystal lattice structures. Temperature sensor 705 may microstructurally change as a function of the temperature surrounding the temperature sensor 705. The temperature sensed by temperature sensor 705 may be read wirelessly by an external receiver/detector, such as an X-ray defractometry, and may be converted to temperature data.

In some embodiments, temperature sensor 705 is configured to retain the microstructural changes and hence the information of the temperature. In these embodiments, temperature sensor 705 is removed from pedestal 730 to collect the temperature information. In other embodiments, temperature sensor 705 may partially transform from solid to liquid at a particular temperature. The temperature may be determined by checking/detecting the phase change of temperature sensor 705.

Figure 5:
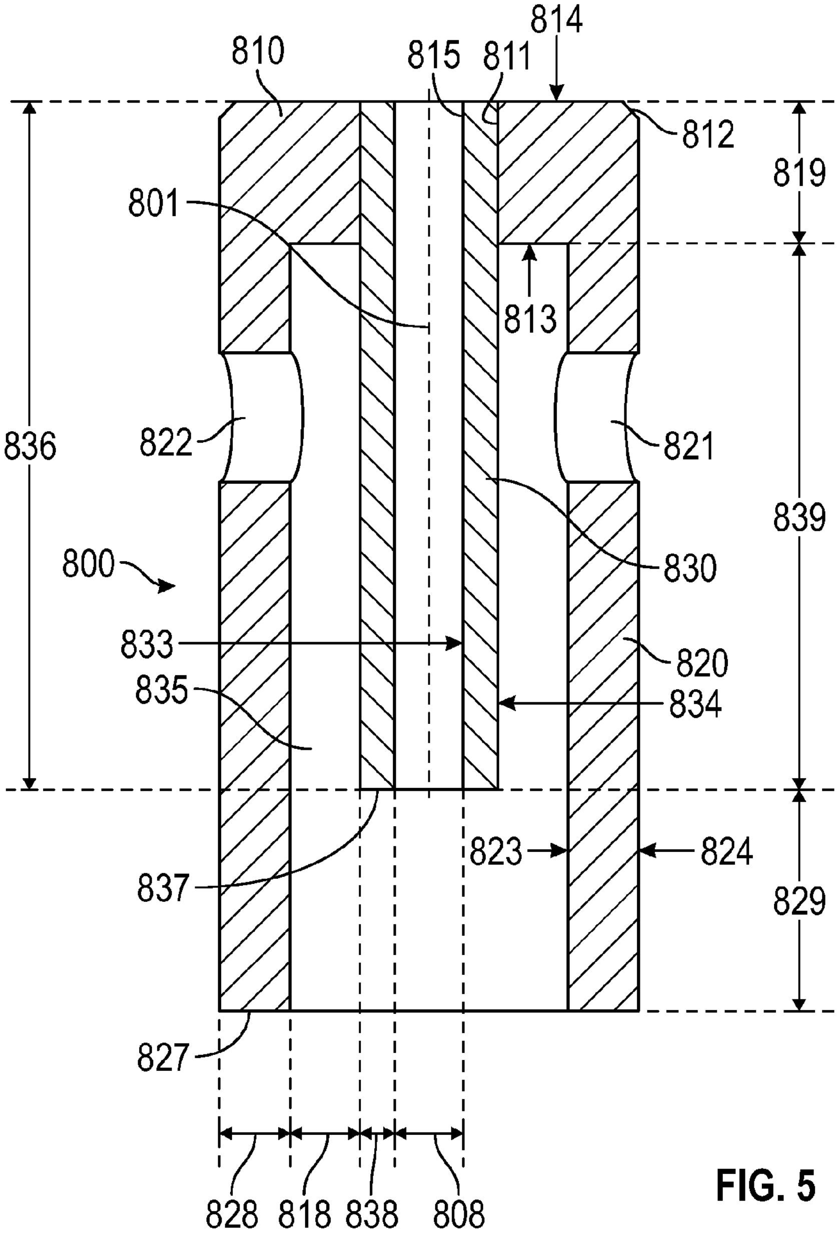
FIG. 5 is a cross-section of an alternate embodiment of the mounting stand of FIG. 2.

In the embodiments illustrated in FIGS. 3 and 4, mounting stand 700 is a single integral piece that includes base 710, shield 720, and pedestal 730. FIG. 5 is a cross-section of an alternate embodiment of a mounting stand 800. As illustrated in FIG. 5, mounting stand 800 is a two piece configuration, where base 810 and shield 820 are a single integral piece and pedestal 830 is a separate piece bonded to base 810 using a bonding agent, such as adhesive paste.

In the embodiment illustrated in FIG. 5, base 810 includes an annular disk shape with a pedestal bore 811 that is sized and configured to fit pedestal 830. Pedestal 830 may extend through base 810 and may extend at a pedestal length 839 beyond base 810. Pedestal length 839 may be the same or similar to pedestal length 739. Pedestal 830 may axially extend from end to end at an overall pedestal length 836. The overall pedestal length 836 may be from 5.6 millimeters (0.12 inches) to 11.7 millimeters (0.461 inches).

In some two piece embodiments, such as the embodiment shown in FIG. 5, shield thickness 828 may be at least 0.635 millimeters (0.025 inches) and may be up to 1.397 millimeters (0.055 inches).

The various components, shapes, and sizes of mounting stand 800, such as shield 820, first bleed hole 821, second bleed hole 822, shield entrance length 829, flow region 835, pedestal thickness 838, outer edge chamfer 812, bore 815, bore diameter 808, offset distance 818, flow region 835, first base surface 813, second base surface 814, pedestal inner surface 833, pedestal outer surface 834, shield inner surface 823, shield outer surface 824, pedestal end 837, shield end 827, and mounting stand axis 801 may be the same or similar as those described in conjunction with the mounting stand 700 of FIGS. 3 and 4.

Each mounting stand 700 and 800 and its various components may be made from a ceramic material resistant to high temperatures, such as alumina, zirconium oxide, or silicon carbide.

INDUSTRIAL APPLICABILITY

Gas turbine engines may be suited for any number of industrial applications such as various aspects of the oil and gas industry (including transmission, gathering, storage, withdrawal, and extraction of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it enters the combustor 300, where it is diffused and fuel is added. Air 10 and fuel are injected into the combustion chamber 390 via fuel injector 310 and combusted. Energy is extracted from the combustion reaction via the turbine 400 by each stage of the series of turbine disk assemblies 420. Exhaust gas 90 may then be diffused in exhaust diffuser 510, collected and redirected. Exhaust gas 90 exits the system via an exhaust collector 520 and may be further processed (e.g., to reduce harmful emissions, and/or to recover heat from the exhaust gas 90).

Operating efficiency and output power of a gas turbine engine generally increases with a higher combustion temperature. Thus, there is a trend in gas turbine engines to increase the combustion temperatures. Gas reaching forward stages of a turbine from a combustion chamber 390 may be 1000 degrees Fahrenheit or more. It may be desirable to measure the temperature of the combustion gases within the gas turbine engine including upstream of the first stage turbine nozzle 450.

While measuring the temperature of the combustion gases along the leading edge 461 of a nozzle segment 451, errors in the measurements may be introduced from conduction, radiation, and convection. Conduction from the nozzle segment 451 through the pedestal 730 may affect the temperature measurement. Providing a pedestal 730 formed of a ceramic material, such as alumina, zirconium oxide, or silicon carbide may reduce the conduction. Extending the pedestal 730 beyond the leading edge 461 to the extruding length 704 may further reduce or prevent the conduction error as the conduction error may correlate to the pedestal length 739. The improvements in conduction error over the length of the pedestal 730 may get incrementally smaller as the length increases. The pedestal length 739 may be increased up to the point where the increase in material cost and potential for durability failure outweighs the incrementally smaller improvement in the conduction error.

The radiation error may be reduced surrounding the pedestal 730 and in particular the temperature sensor 705 with shield 720. A reduction in the radiation error may correlate to the entrance length 729, the distance that shield 720 extends beyond pedestal 730. The entrance length 729 may be increased by increasing the length of shield 720 up to the point where the increase in material cost and potential for durability failure outweighs the improvement in the radiation error.

The convection error may be reduced by increasing the flow area 736 defined by the offset distance 718 between shield 720 and pedestal 730 and/or by decreasing the size of aspiration holes 721 and 722. The flow area 736 can be varied until the flow through the flow region 735 begins to stagnate. Increasing the flow area 736 and decreasing the size of aspiration holes 721 and 722 may reduce the temperature error and may promote a time accurate reading.

Use of a ceramic material may reduce the cost of the mounting stand 700 over the use of a high temperature metal alloy. Use of the two piece mounting stand 800 may further reduce the cost.

Use of the single integral piece mounting stand 700 may reduce or prevent any tolerance issues between pieces and may improve the strength of the part as it may not require any bonds.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes a particular mounting stand for a temperature sensor, it will be appreciated that the mounting stand in accordance with this disclosure can be implemented in various other configurations, can be used with various other types of gas turbine engines, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A mounting stand for a temperature sensor, the mounting stand comprising:

a base for mounting the temperature sensor to an airfoil of a gas turbine engine, the base including a cylindrical disk for inserting into an embed hole of the airfoil;

a pedestal extending from the base to a pedestal end distal to the base at a pedestal length, the pedestal including a first hollow cylinder shape forming a bore there through, the bore being sized to hold the temperature sensor; and a shield including a second hollow cylinder shape extending from the base about the pedestal and extending beyond the pedestal to a shield end distal to the base forming a flow region with an annular shape between the pedestal and the shield, and a first aspiration hole extending through the second hollow cylinder shape; and wherein the temperature sensor is secured within the bore using a bonding agent, and the temperature sensor is configured to microstructurally change according to a temperature surrounding the temperature sensor wherein the base, the pedestal, and the shield are formed of a ceramic material.

2. The mounting stand of claim 1, wherein the pedestal length is at least 4 millimeters.

3. The mounting stand of claim 2, wherein the pedestal length is up to 10 millimeters.

4. The mounting stand of claim 1, wherein the shield end extends from 1.9 millimeters to 5.08 millimeters beyond the pedestal end.

5. The mounting stand of claim 1, wherein the flow region includes cross-sectional area of at least 4.458 square millimeters.

6. The mounting stand of claim 1, wherein the second hollow cylinder shape includes a radial thickness from 0.635 millimeters to 1.905 millimeters.

7. The mounting stand of claim 1, wherein the shield includes a second aspiration hole, and the diameter of the first aspiration hole and the diameter of the second aspiration hole are at least 0.762 millimeters.

8. The mounting stand of claim 1, wherein the base, the pedestal, and the shield are a single integral piece.

9. A nozzle segment for a nozzle ring of a gas turbine engine, the nozzle segment comprising:

an upper endwall;

a lower endwall;

an airfoil extending between the upper endwall and the lower endwall, the airfoil including a leading edge extending from the upper endwall to the lower endwall, the leading edge including a trailing edge extending from the upper endwall to the lower endwall distal to the leading edge, a pressure side wall extending from the leading edge to the trailing edge, and a suction side wall extending from the leading edge to the trailing edge;

an embed hole bored into the leading edge;

a mounting stand formed of a ceramic material, the mounting stand including a base including a cylindrical disk shape inserted into the embed hole at an embed length, the base being bonded to the airfoil, a pedestal coaxial to the base and extending axially from the base at a pedestal length from 4 millimeters to 10 millimeters, the pedestal including a first hollow cylinder shape forming a bore there through, and a shield coaxial to the base, the shield including a second hollow cylinder shape extending axially from the base at least 1.9 millimeters beyond the pedestal and being located radially outward from the pedestal at an offset distance up to 1.27 millimeters forming a flow region with an annular shape there between, a first aspiration hole extending radially through the second hollow cylinder shape, the first aspiration hole including a first diameter of at least 0.762 millimeters, and a second aspiration hole extending radially through the second hollow cylinder shape including a second diameter of at least 0.762 millimeters; and a temperature sensor inserted into the bore distal to the base.

10. The nozzle segment of claim 9, wherein the base is bonded to the airfoil with a bonding agent.

11. The nozzle segment of claim 10, wherein the bonding agent is zirconia 940.

12. The nozzle segment of claim 9, wherein the temperature sensor includes an irradiated crystal configured to change microstructurally according to a temperature surrounding the temperature sensor.

13. The nozzle segment of claim 9, wherein the offset distance is at least 0.635 millimeters.

14. The nozzle segment of claim 9, wherein the shield includes a radial thickness of at least 0.635 millimeters.

15. A mounting stand for attaching a temperature sensor to a nozzle segment of a gas turbine engine, the mounting stand comprising:

a base having a cylindrical disk shape for inserting into an embed hole bored into the nozzle segment, the base including a first base surface with a first annular shape, and a second base surface with a second annular shape forming an annular disk shape with a pedestal bore;

a pedestal extending axially beyond the first base surface to a pedestal end distal to the base at a pedestal length of at least 4 millimeters, the pedestal including a pedestal inner surface with a first cylindrical shape forming a bore through the pedestal, the bore being sized to hold the temperature sensor, and a pedestal outer surface with a second cylindrical shape located radially outward from the pedestal inner surface forming a first hollow cylinder; and a shield extending axially from the first base surface to a shield end distal to the base beyond the pedestal end by at least 1.9 millimeters, the shield including a shield inner surface with a third cylindrical shape located radially outward from the pedestal outer surface at an offset distance up to 1.27 millimeters forming a flow region with an annular shape there between, a shield outer surface with a fourth cylindrical shape located radially outward from the shield inner surface forming a second hollow cylinder shape, and a first aspiration hole extending radially through the second hollow cylinder shape, the first aspiration hole including a first diameter of at least 0.762 millimeters;

wherein the base, the pedestal, and the shield are formed of a ceramic material.

16. The mounting stand of claim 15, wherein the shield includes a radial thickness between the shield inner surface and the shield outer surface from 0.635 millimeters to 1.905 millimeters.

17. The mounting stand of claim 15, wherein the temperature sensor is secured within the bore using a bonding agent, and a microstructure of the temperature sensor is used to determine a temperature surrounding the temperature sensor.

18. The mounting stand of claim 15, wherein the shield extends from the first base surface to the shield end up to 5.08 millimeters beyond the pedestal end.

19. The mounting stand of claim 15, wherein the pedestal is bonded to the base at the pedestal bore and the shield is integral to the base.

* * * * *